S. T. FOWLER.
Building Blocks.
No. 139,462.  Patented June 3, 1873.
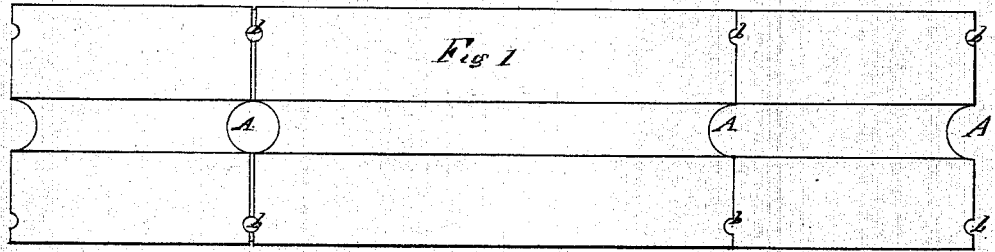
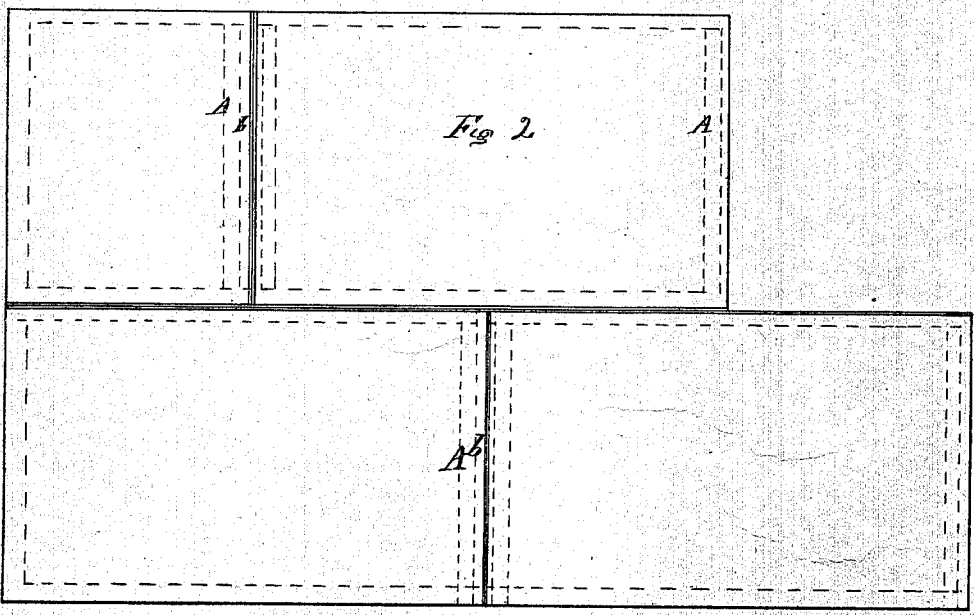

UNITED STATES PATENT OFFICE.

SAMUEL T. FOWLER, OF BROOKLYN, NEW YORK.

IMPROVEMENT IN BUILDING-BLOCKS.

Specification forming part of Letters Patent No. 139,462, dated June 3, 1873; application filed April 12, 1872.

*To all whom it may concern:*

Be it known that I, SAMUEL T. FOWLER, of the city of Brooklyn, county of Kings and State of New York, have invented a certain new and useful form of Building-Blocks, to facilitate and render more perfect the laying of the same in walls, of which the following is a specification:

This invention relates to a form of concrete or stone-building blocks, to be laid in the wall dry and mortared, or cemented after laid, and is intended to save labor, the tarnishing of the blocks with mortar, and to secure more exact and better work at less cost. It consists in the making of round, square, or flat grooves, near the center on all sides of the blocks, where it is desired, and of a size suitable for the reception of mortar of the desired consistency, as shown by A; also, grooves on the perpendicular ends each side of the mortar grooves, as shown by b, between it and each face, of a size suitable for the reception of dry cement, plaster, or lime mixed or unmixed with appropriate materials; and in the use of dry materials as a bed for the block and as an absorbent for any moisture that might otherwise escape to soil the surface of the block.

In using this invention, as each tier of blocks is laid, the outer perpendicular grooves should be filled with the dry material before filling the mortar-groove, and on each tier the dry material should be evenly spread, to furnish a bed for the next tier; also, the dry material on the two sides of the mortar-groove may differ to suit a difference of finish or exposure, as in the outer and inner sides.

By the dry bed the adjustments of the blocks are rendered easy, and moisture is furnished by the mortar in the groove to convert the dry material into paste or mortar for the adhesion of the blocks, and all together it renders easy the laying of double-faced blocks the thickness of the desired wall with dispatch, exactitude, neatness, and firmness.

I claim—

The grooves b for the reception of the dry cement, in combination with the mortar-grooves, for the purpose of constructing a wall of building-blocks with wet mortar and dry cement, in combination substantially as described.

SAMUEL T. FOWLER.

Witnesses:
 AMOS BROADNAX,
 JAMES O. HOYT.